(12) United States Patent
Bijlenga et al.

(10) Patent No.: US 6,898,095 B2
(45) Date of Patent: May 24, 2005

(54) BIDIRECTIONAL VSC CONVERTER WITH A RESONANT CIRCUIT

(75) Inventors: Bo Bijlenga, Åmål (SE); Gunnar Asplund, Ludvika (SE); Peter Lundberg, Västerås (SE); Tomas Jonsson, Västerås (SE); Niklas Johansson, Västerås (SE); Staffan Norrga, Västerås (SE)

(73) Assignee: ABB AB, Västerås (SE)

( * ) Notice: Subject to any disclaimer, the term of this patent is extended or adjusted under 35 U.S.C. 154(b) by 5 days.

(21) Appl. No.: 10/474,728

(22) PCT Filed: Apr. 10, 2002

(86) PCT No.: PCT/SE02/00697

§ 371 (c)(1),
(2), (4) Date: Jun. 4, 2004

(87) PCT Pub. No.: WO02/084856

PCT Pub. Date: Oct. 24, 2002

(65) Prior Publication Data

US 2004/0218318 A1 Nov. 4, 2004

(30) Foreign Application Priority Data

Apr. 11, 2001 (SE) .............................................. 0101273

(51) Int. Cl.$^7$ ........................................... H02M 7/5387
(52) U.S. Cl. .................. 363/132; 363/56.05; 363/56.12
(58) Field of Search ........................... 363/56.02, 56.05, 363/56.12, 58, 132, 136, 137, 138

(56) References Cited

U.S. PATENT DOCUMENTS

| | | | | |
|---|---|---|---|---|
| 5,047,913 A | * | 9/1991 | De Doncker et al. .......... 363/95 |
| 5,633,793 A | * | 5/1997 | Lee et al. ..................... 363/127 |
| 5,644,483 A | * | 7/1997 | Peng et al. ..................... 363/37 |
| 5,684,688 A | | 11/1997 | Rouaud et al. |
| 5,898,583 A | * | 4/1999 | Delgado et al. ............... 363/98 |
| 5,946,178 A | * | 8/1999 | Bijlenga ..................... 361/91.5 |
| 5,949,669 A | * | 9/1999 | Bruckmann et al. ......... 363/132 |
| 6,248,461 B1 | * | 6/2001 | Abe et al. ..................... 429/22 |
| 6,259,616 B1 | * | 7/2001 | Ekwall et al. ............... 363/132 |
| 6,278,626 B1 | * | 8/2001 | Teichmann ................. 363/135 |
| 6,519,169 B1 | * | 2/2003 | Asplund et al. ............. 363/132 |
| 6,603,675 B1 | * | 8/2003 | Norrga ........................ 363/132 |

* cited by examiner

Primary Examiner—Jeffrey Sterrett
(74) Attorney, Agent, or Firm—Venable LLP; Eric J. Franklin

(57) ABSTRACT

The invention relates to a VSC-converter for converting direct voltage into auxiliary voltage and vice versa, which comprises a series connection of at least two current valves (5, 6) arranged between two poles (7, 8), a positive and a negative, of a direct voltage side of the converter, each current valve comprising several series connected circuits (12), each of which circuits comprising a semiconductor component (13) of turn-off type and a rectifying component (14) connected in anti-parallel therewith, an alternating voltage phase line (16) being connected to a midpoint (15), denominated phase output, of the series connection of current valves (5, 6) between two of said current valves while dividing the series connection into two equal parts. Each of the series connected circuits (12) of the respective current valve comprises, in order to make possible a good voltage distribution between the semiconductor components (13) of turn-off type included in the respective current valve, a snubber capacitor (17) connected in parallel with the semiconductor component (13) of turn-off type included in the circuit. The converter (1) further comprises a resonance circuit (18) for recharging the snubber capacitors (17) of the current valves.

19 Claims, 5 Drawing Sheets

BIDIRECTIONAL VSC CONVERTER WITH A RESONANT CIRCUIT

FIELD OF THE INVENTION AND PRIOR ART

The present invention relates to a VSC-converter according to the preamble of the subsequent claim 1.

A VSC-converter for connection between a direct voltage net-work and an alternating voltage network is previously known e.g. from the thesis "PWM and control of two and three level High Power Voltage Source Converters" by Anders Lindberg, Royal Institute of Technology, Stockholm, 1995, in which publication a plant for transmitting electric power through a direct voltage network for high-voltage direct current (HVDC), while utilizing such converters, is described. Before the creation of this thesis, plants for transmitting electric power between a direct voltage network and an alternating voltage network have been based upon the use of network commutated CSC(Current Source Converter)-converters in stations for power transmission. However, in this thesis a totally new concept is described, which is based on instead using VSC(Voltage Source Converter)-converters for forced commutation for transmitting electric power between a direct voltage network being voltage stiff therethrough, in the case in question for high-voltage direct current, and alternating voltage networks connected thereto, which offers several considerable advantages as compared to the use of network commutated CSC-converters in HVDC, among which it may be mentioned that the consumption of active and reactive power may be controlled independently of each other and that there is no risk of commutation faults in the converters and thereby no risk of commutation faults being transmitted between different HVDC-links, as may occur with network commutated CSC:s. Furthermore, it is possible to feed a weak alternating voltage network or a network without any generation of its own (a dead alternating voltage network). There are also further advantages.

The inventional VSC-converter may be included in a plant for transmitting electric power through a direct voltage network for high-voltage direct current (HVDC), in order to e.g. transmit the electric power from the direct voltage network to an alternating voltage network. In this case, the converter has its direct voltage side connected to the direct voltage network and its alternating voltage side connected to the alternating voltage network. The inventional VSC-converter may however also be directly connected to a load, such as a high-voltage generator or motor, in which case the converter has either its direct voltage side or its alternating voltage side connected to the generator/motor. The invention is not limited to these applications; on the contrary the converter may just as well be used for conversion in a SVC (Static Var Compensator) or a Back-to-back station. The voltages on the direct voltage side of the converter are with advantage high, 10–400 kV, preferably 130–400 kV. The inventional converter may also be included in other types of FACTS-devices (FACTS=Flexible Alternating Current Transmission) than the ones mentioned above.

VSC-converters are known in several designs. In all designs, a VSC-converter comprises a number of so-called current valves, each of which comprising a semiconductor element of turn-off type, such as an IGBT (Insulated Gate Bipolar Transistor) or a GTO (Gate Turn-Off Thyristor), and a rectifying member in the form of a diode, normally a so-called free wheeling diode, connected in anti-parallel therewith. Each semiconductor element of turn-off type is normally in high voltage applications built up of several series connected, simultaneously controlled semiconductor components of turn-off type, such as several separate IGBT:s or GTO:s. In high-voltage applications a comparatively high number of such semiconductor components is required in order to hold the voltage to be held by each current valve in the blocking state. In the corresponding manner, each rectifying member is built up of several series connected rectifying components. The semiconductor components of turn-off type and the rectifying components are in the current valve arranged in several series connected circuits, each of which circuits comprising i.a. a semiconductor component of turn-off type and a rectifying component connected in anti-parallel therewith.

In the manufacturing of VSC-converters intended for high-voltage applications, it is in the current valves of the converter desirable to use semiconductor components of turn-off type that are dimensioned to stand a voltage as high as possible. Hereby, the conduction losses in the current valves can be reduced. The use of high-voltage components also entails that the number of components of the current valves, and thereby the manufacturing costs for the converter, can be limited. High-voltage semiconductor components designed for low conduction losses do however have the characteristic that they during the conduction process will build up a conductive plasma that will cause a relatively large reverse recovery amount when the semiconductor component is turned off or the rectifying component connected in anti-parallel therewith is commutated off. Since this reverse recovery amount, on grounds of manufacturing technique and due to temperature variations between different components during operation, varies from component to component, it is in practise not possible to achieve a completely synchronous turn-off of the current through all the semiconductor components. This entails that the voltage distribution between the semiconductor components of turn-off type in one and the same current valve will be unequal. Such an unequal voltage distribution will i.a. result in an unequal degradation of the semiconductor components of turn-off type included in the current valves, and is therefore not desired.

OBJECT OF THE INVENTION

The object of the present invention is to achieve a VSC-converter according to the preamble of claim 1, in which the above-described problem with unequal voltage distribution of the semiconductor components of turn-off type included in the current valves is reduced.

SUMMARY OF THE INVENTION

According to the invention, said object is achieved by means of a VSC-converter having the features indicated in the characterizing part of claim 1.

In the inventional VSC-converter, a good voltage distribution between the semiconductor components of turn-off type included in a current valve is achieved by means of snubber capacitors, each of which being connected in parallel with a semiconductor component of turn-off type. By using a resonance circuit for recharging these snubber capacitors, it will also be possible to avoid high turn-on losses in connection with the turn-on of the semiconductor components of turn-off type of the current valves. The resonance circuit is adapted to achieve recharge of the snubber capacitors in connection with turn-on of the semiconductor components of turn-off type in the current valves of the converter so that said semiconductor components can be turned on at low voltage instead of high voltage, whereby the turn-on losses in the semiconductor components of the current valves are limited. The resonance circuit is also used in connection with turn-off of the semiconductor components in the current valves when the phase current is so low that the switching time for the voltage in the phase output otherwise would be unreasonable long. The solution according to the invention consequently implies that semiconductor components dimensioned for very high voltages can be used in the current valves of the converter while maintaining a good voltage distribution in the current valves and low turn-on losses.

In this description and the subsequent claims, the expression resonance circuit refers to the circuit by means of which the recharge of the snubber capacitors is effected. In its proper sense, the expression resonance circuit also embraces said snubber capacitors, but for the sake of simplicity and clarity it will here be made a distinction between the components denominated snubber capacitors and the other parts of the resonance circuit. Consequently it is these "other parts of the resonance circuit" which here and in the following will be denominated "resonance circuit".

The solution according to the invention will give particularly large advantages in VSC-converters connected to high-voltage networks, with a network voltage of about 130–400 kV, but will also give advantages at lower network voltages, for instance in the order of 10–130 kV.

According to a preferred embodiment of the invention, the resonance circuit is an ARCP-circuit (ARCP=Auxilary Resonant Commutation Pole). A resonance circuit of this type has proven to be very suitable for the application here in question.

According to a further preferred embodiment of the invention, the ARCP-circuit comprises an auxiliary valve comprising several series connected sets of auxiliary valve circuits, where each set comprises two series connected auxiliary valve circuits, each of which comprising a semiconductor component of turn-off type and a rectifying component connected in anti-parallel therewith, the semiconductor components of turn-off type in the two auxiliary valve circuits in one and the same set being arranged in opposite polarity in relation to each other. By making the ARCP-circuit comprising several sets of auxiliary valve circuits in this manner, instead of one single set as conventional, it will in a simple manner be possible to adapt the ARCP-circuit in dependence of the desired characteristics of the converter.

According to a further preferred embodiment of the invention, the ARCP-circuit comprises several series connected partial circuits, each of which comprising a set of auxiliary valve circuits connected in series with an inductor, the ARCP-circuit further comprising a number of capacitors, which are connected in parallel with a respective partial circuit. By dividing the inductance of the resonance circuit on several separate inductors and arranging a capacitor connected in parallel with each of said partial circuits in the indicated manner, the problem with unequal voltage distribution between the auxiliary valve circuits included in the resonance circuit caused by stray capacitances to ground is reduced. This embodiment is particularly advantageous in VSC-converters dimensioned for very high voltages with a voltage on the direct voltage side amounting to 100 kV or more.

According to a further preferred embodiment of the invention, each set of auxiliary valve circuits of the ARCP-circuit comprises a voltage dividing circuit connected in parallel with the auxiliary valve circuits included in the set. Hereby, a good voltage distribution between the auxiliary valve circuits included in the resonance circuit is secured.

According to a further preferred embodiment of the invention, the respective current valve comprises such a number of series connected circuits, where each circuit comprises a semiconductor component of turn-off type and a rectifying component connected in anti-parallel therewith, that at least one of these circuits is redundant with respect to the voltage that the current valve is intended to hold in the blocking state. Hereby the current valve can continue to function even in case of a breakdown in one component in one of the series connected circuits, which is of very great importance with respect to the safety of operation of the VSC-converter. In this case, it is preferred that each of said series connected circuits is so designed that the circuit is short-circuited in case of an electric fault therein. Thereby, it is secured that a breakdown in a circuit will get as little influence as possible on the operation of the current valve, since the current relatively unimpedeately is allowed to pass the broken down circuit in both directions.

According to a further preferred embodiment of the invention the auxiliary valve of the ARCP-circuit comprises such a number of said sets of auxiliary valve circuits that at least one of the sets is redundant with respect to the voltage that the auxiliary valve is intended to hold in the blocking state. Thereby, the ARCP-circuit can continue to operate even in case of a breakdown in the component in one of the auxiliary valve circuits. It is also here preferred that each of the auxiliary valve circuits is so designed that the auxiliary valve circuit is short-circuited in case of an electric fault therein. Thereby, it is secured that a break-down in an auxiliary valve circuit will get as little influence as possible on the operation of the ARCP-circuit, since the current relatively unimpededly is allowed to pass the broken-down auxiliary valve circuit in both directions.

Further preferred embodiments of the inventional VSC-converter will appear from the dependent claims and the subsequent description.

BRIEF DESCRIPTION OF THE DRAWING

The invention will in the following be more closely described by means of embodiment examples, with reference to the appended drawing. It is shown in.

DETAILED DESCRIPTION OF PREFERRED EMBODIMENTS

Figure 1:
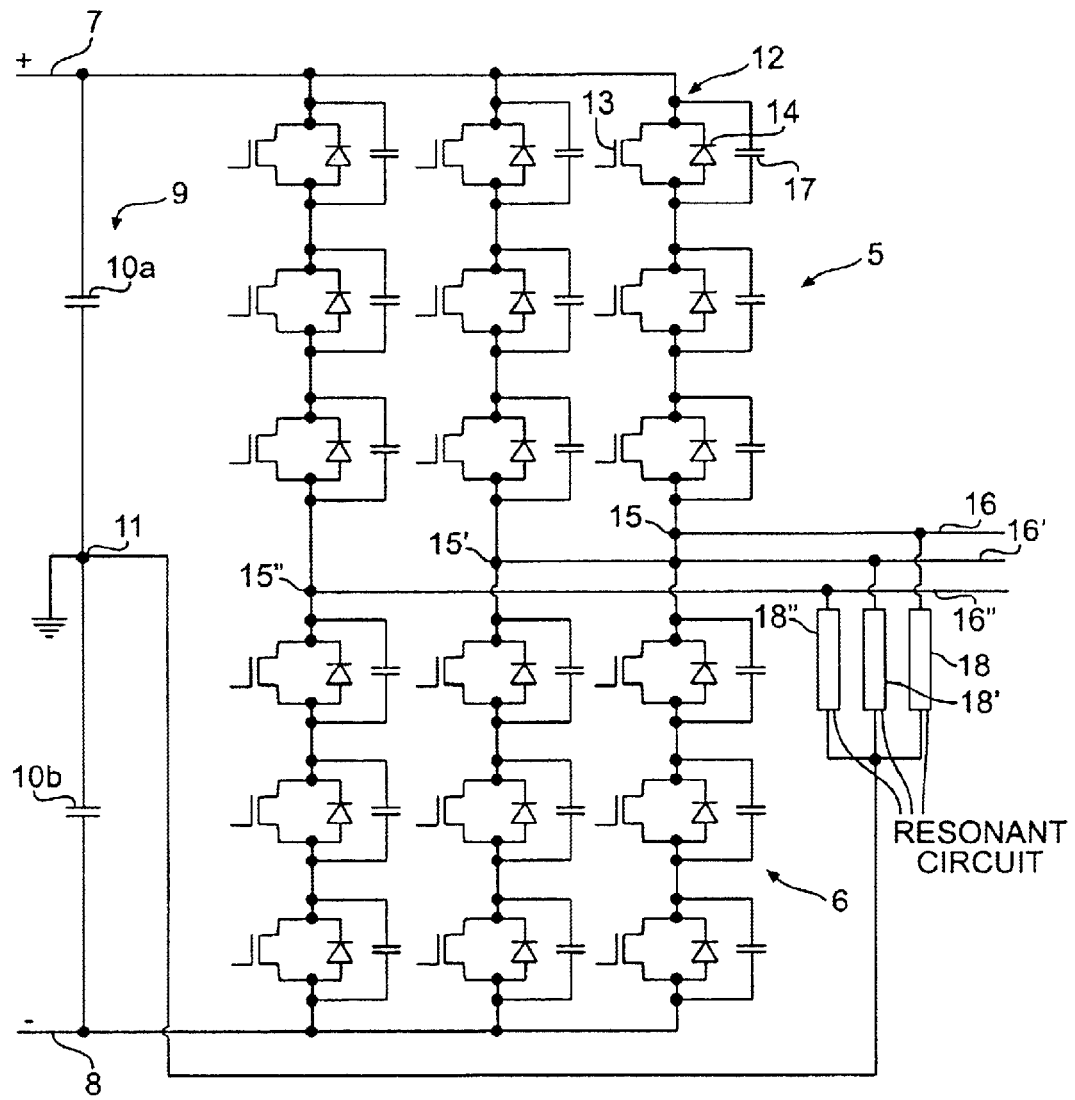
FIG. 1 a simplified circuit diagram illustrating a VSC-converter according to a first embodiment of the invention, FIG. 2 a simplified circuit diagram illustrating a VSC-converter according to a second embodiment of the invention, FIG. 3 a simplified circuit diagram illustrating a VSC-converter according to a preferred embodiment of the invention, FIG. 4 a simplified circuit diagram illustrating a VSC-converter according to a further preferred embodiment of the invention, and FIGS. 5–7 simplified circuit diagrams illustrating voltage dividing circuits of different designs intended to be included in the resonance circuit of a VSC-converter according to the invention.
Figure 2:
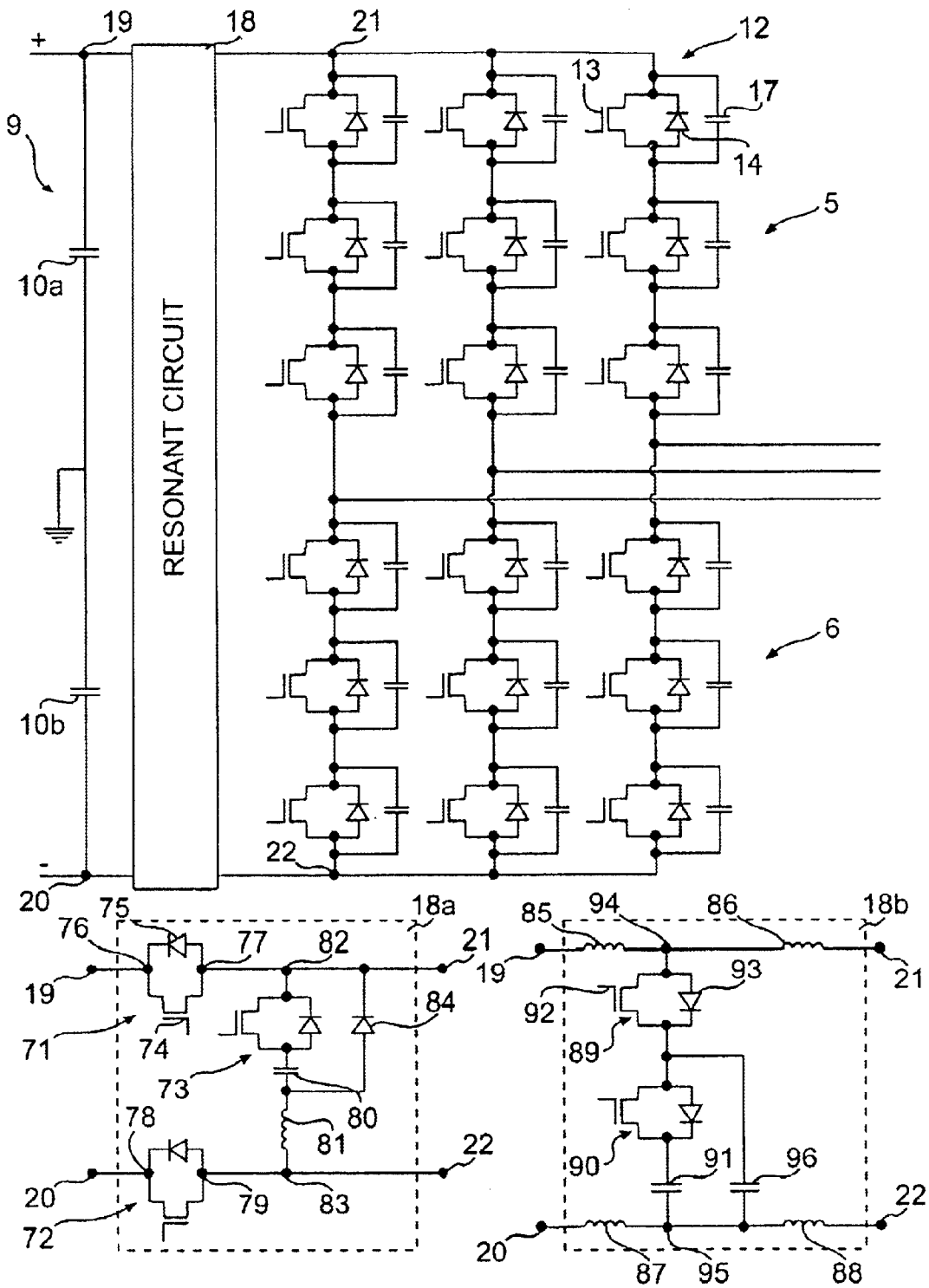

FIGS. 1 and 2 schematically illustrate two alternative embodiments of a VSC-converter 1 according to the invention. The converter is here provided with three so-called phase legs 2–4 and is consequently adapted for a three-phase alternating voltage network. This type of assemblage with three-phase legs is normally denominated three-phase bridge. The VSC-converter could however also be adapted for an alternating voltage network having more as well as fewer phases than three. It could for instance be adapted for a single phase alternating voltage network and would in such a case only have one phase leg of the type in question.

Each phase leg 2–4 of the VSC-converter illustrated in FIGS. 1 and 2 has two current valves 5, 6 connected in series between the two poles 7, 8 of a direct voltage side of the converter. A capacitor circuit 9 comprising at least one so-called intermediate link capacitor is arranged between the two poles 7, 8. In the converter illustrated in FIGS. 1 and 2 the capacitor circuit 9 comprises two series connected intermediate link capacitors 10a, 10b. A point 11 between these capacitors 10a, 10b is here, as customary, connected to ground so as to provide the potentials +U/2 and −U/2, respectively, at the respective pole, U being the voltage between the two poles 7, 8. The grounding point 11 may however be excluded, for instance in SVC-applications.

The respective current valve 5, 6 comprises, in accordance with the above indicated, several series connected circuits 12, each of which circuit comprising a semiconductor component 13 of turn-off type, such as an IGBT, a GCT or a GTO, and a rectifying component 14, in the form of a diode, such as a free wheeling diode, connected in anti-parallel therewith. In the embodiments shown in FIGS. 1 and 2 each current valve 5, 6 comprises three series connected circuits 12 of the type described above, but the series connected circuits 12 may be larger as well as smaller in number. Depending i. a. on the voltage for which the converter is designed, the number of said series connected circuits 12 in the respective current valve 5, 6 may extend from two up to several hundred.

A midpoint 15 of the series connection between the two current valves 5 and 6, which constitutes the phase output of the converter, is connected to an alternating voltage phase line 16. In this manner, said series connection is divided into two equal parts with one current valve 5 and 6, respectively, in each such part. In the embodiment with three phase legs 2–4, the converter consequently comprises three phase outputs 15, 15', 15", which are connected to a respective alternating voltage phase line 16, 16', 16" of a three-phase alternating voltage network. The phase outputs are normally connected to the alternating voltage network via electric equipment in the form of breakers, transformers etc.

According to the invention, each of the series connected circuits 12 of the respective current valve 5, 6 is provided with a capacitor 17, here denominated snubber capacitor, connected in parallel with the semiconductor component 13 of turn-off type included in the circuit. The capacitance of the respective snubber capacitor 17 must be so high that a good voltage distribution between the semiconductor components 14 of turn-off type included in the respective current valve is made possible in connection with turn-off of the semiconductor components of turn-off type of a current valve. The choice of capacitance of the snubber capacitors 17 is adapted from case to case and depends i.a. on the voltage-blocking capacity and the current-handling capacity of the semiconductor components 13 of turn-off type and the rectifying components 14 and the manufacturing tolerance of these components with respect to the reverse recovery amount. The snubber capacitors 17 also help to limit the turn-off losses, i.e. the losses in the semiconductor components of turn-off type when these are turned off.

When the semiconductor components 13 of a current valve are turned off, the snubber capacitors 17 that are connected across these semiconductor components 13 will be charged. If the snubber capacitors 17 keep this charge when the semiconductor components 13 subsequently are turned on, turn-on losses will ensue in the semiconductor components 13. The relatively high capacity snubber capacitors 17 that will come into question in this connection will in this case cause very high turn-on losses, which turn-on losses make the use of high switching frequencies impossible. In order to eliminate or at least reduce these turn-on losses, and make possible the use of high switching frequencies, the converter according to the invention is provided with a resonance circuit 18 for recharging the snubber capacitors 17 of the current valves. This resonance circuit is intended to accomplish discharge of the snubber capacitors 17 of a current valve when the semiconductor components 13 of the current valve are to be turned on, so that the voltage across the respective semiconductor component 13 is equal to or close to zero when it is turned on, whereby the turn-on losses are limited.

The resonance circuit 18 is suitably of a so-called quasi-resonant type, which implies that the resonance only is initiated when the current is to be commutated between two current valves, i.e. when the voltage on the phase output of the converter is to be changed-over. Resonance circuits of this type are known in several designs and have i.a. been proposed for use in converters where each current valve is provided with a snubber capacitor connected in parallel across the entire current valve. The use of a quasi-resonant so-called ARCP-circuit is for instance described in U.S. Pat. No. 5,047,913.

Two alternative locations of a resonance circuit for recharging the snubber capacitors 17 of the current valves are illustrated in FIGS. 1 and 2. According to the embodiment shown in FIG. 1, the resonance circuit 18 is connected between the phase output 15 and the midpoint 11 of the resonance circuit 9, which midpoint 11 can be either grounded or ungrounded as previously mentioned. Each phase leg 2–4 is in this case provided with a separate resonance circuit. In the converter illustrated in FIG. 1, a first resonance circuit 18 is consequently connected between a first phase output 15 and said midpoint 11, a second resonance circuit 18' is connected between a second phase output 15' and said midpoint 11 and a third resonance circuit 18" is connected between a third phase output 15" and said midpoint 11. The respective resonance circuit 18, 18', 18" here suitably consists of a so-called ARCP-circuit (ARCP= Auxilary Resonant Commutation Pole). This ARCP-circuit may for instance be of the type shown in said U.S. Pat. No. 5,047,913, which comprises an auxiliary valve consisting of one set of two series connected auxiliary valve circuits, each of which comprising a semiconductor component of turn-off type and a rectifying component connected in anti-parallel therewith, the semiconductor components of turn-off type of the two auxiliary valve circuits being arranged in opposite polarity in relation to each other. The ARCP-circuit further comprises an inductor connected in series with said set of auxiliary valve circuits. ARCP-circuits with a design particularly suitable for the inventional application will be described more closely below with reference to FIGS. 3 and 4.

In this description and the subsequent claims, the expression auxiliary valve refers to the current valves included in a resonance circuit 18.

An advantage with arranging the resonance circuit in the manner illustrated in FIG. 1 is that symmetry in relation to ground is automatically obtained, i.e. the resonance circuits will not cause any direct voltages on the alternating voltage side of the converter. Furthermore, each phase is treated separately, which is advantageous with respect to supervision.

According to the embodiment shown in FIG. 2, the resonance circuit 18 is connected between the two pole connections 19, 20 of the capacitor circuit and the two pole connections 21, 22 of the current valves. In the embodiment with three phase legs 2–4, the current valves of all three phase legs have a common connection 21 to one 7 of the poles and a common connection 22 to the other pole. The resonance circuit 18 is here adapted to inject a resonance current of the direct voltage side of the converter, between the negative pole 7 and the positive pole 8, in order to shortly bring the pole voltage to zero without discharging the intermediate link capacitors 10a, 10b. Normally, a current that is superposed the load current is in this case shortly forced in the reverse direction through all the rectifying components 14 of the converter. The commutation of the load current is performed when all the rectifying components 14 are conducting and the snubber capacitors 17 have been discharged, i.e. when the voltage across all the current valves 5, 6 is zero or close to zero. Hereby, it will be possible to turn on or turn off a current valve 5, 6 when the voltage across the current valve is zero or close to zero. In order to prevent the intermediate link capacitors 10a, 10b from being discharged, the resonance circuit 18 comprises in this case either inductors 85, 87 or auxiliary valves 71, 72 or both in order to insulate the intermediate link capacitors from the pole connections 21, 22 of the current valves, i.e. in this case from the three-phase bridge. The resonance circuit 18 in the embodiment illustrated in FIG. 2 should be so designed that the insulation of the intermediate link capacitors 10a, 10b from the current valves takes place in a symmetric manner. Hereby it is avoided that all the phases are connected to one or the other of the two poles in connection with commutation, which is of importance for the avoidance of direct voltage components on the alternating voltage side of the converter.

Two different designs of resonance circuits suitable for being included in a converter according to the invention is illustrated in FIG. 2. One 18a of these resonance circuits comprises a first 71, a second 72 and a third 73 auxiliary valve, each of which comprising a semiconductor element 74 of turn-off type, such as an IGBT, a GCT or a GTO, and a rectifying member 75 in the form of a diode, such as a free wheeling diode, connected in antiparallel therewith. The first auxiliary valve 71 has one 76 of its ends connected to a first 19 of the pole connections of the capacitor circuit and its other end 77 connected to the corresponding first pole connection 21 of the current valves. The second auxiliary valve 72 has one 78 of its ends connected to a second 20 of the pole connections of the capacitor circuit and its other end 79 connected to the corresponding second pole connection 22 of the current valves. The third auxiliary valve 73 forms a series connection together with a capacitor 80 and an inductor 81, which series connection has one 82 of its ends connected between the second end 77 of the first auxiliary valve 75 and the first pole connection 21 of the current valves, and its other end 83 connected between the second end 79 of the second auxiliary valve 72 and the second pole connection 22 of the current valves. The resonance circuit 18a further comprises a rectifying member 84 connected in series with the inductor 81 and in parallel with a series connection formed by the third auxiliary valve 73 and said capacitor 80.

The auxiliary vales 71 and 72, which are conducting in the normal state, are used in order to electrically insulate the intermediate link capacitors 10a, 10b from the so-called three-phase bridge, i.e. the current valves 5, 6 of the three phase legs 2–4, when the voltage across the three-phase bridge is shortly brought to zero in connection with commutation. The two auxiliary valves 71, 72 are each able to take up half the pole voltage and insulate the intermediate link capacitors from the three-phase bridge in a symmetrical manner, which is advantageous when the capacitor circuit 9 is grounded in its midpoint. The auxiliary valve 73 is used in order to start the resonance that discharges the snubber capacitors 17 in the three-phase bridge. The capacitor 80 and the inductor 81 are used as energy storing components in order to, when the voltage across the three-phase bridge is equal to zero, shortly store the energy that existed in the resonance capacitors 17 of the three-phase bridge before the starting of the commutation process. This energy can subsequently be returned to the resonance capacitors 17 of the three-phase bridge without being lost.

The resonance circuit 18a will operate as follows. Initially the voltage across the capacitor 80 is close to zero. By shortly turning on the semiconductor elements 74 of the auxiliary valves 71, 72 and 73, energy is fed into the capacitor 80 and the inductor 81 from the intermediate link capacitors 10a, 10b. When the semiconductor elements 74 in the auxiliary valves 71 and 72 are subsequently turned off, the current through the inductor 81 will force the voltage across the three-phase bridge down to zero, whereupon all the rectifying members 14 in the three-phase bridge will start to conduct and the snubber capacitors 17 will be discharged. A commutation can now take place in any of the three phase legs 2–4 of the three-phase bridge. When the current in the inductor 81 has returned to zero, the capacitor 80 will be charged with an energy approximately corresponding to the energy that was supplied from the intermediate link capacitors 10a, 10b at the start of the process plus the energy that the snubber capacitors 17 in the three-phase bridge had before they began to discharge. During the commutation process energy from the alternating voltage side of the converter has also been fed into or out of the capacitor 80 during the time the semiconductor elements 74 of the auxiliary valves 71 and 72 have been blocked. The energy in the capacitor 80 is then used in order to bring back energy to the resonance capacitors 17 of the three-phase bridge. The remaining energy is brought back to the intermediate link capacitors 10a, 10b, via the rectifying members 73 and 84.

The second 18b of the resonance circuits illustrated in FIG. 2 comprises a first inductor 85 and a second inductor 86 connected in series with each other and in series with the capacitor circuit 9 and the current valves 5, 6 between a first 19 of the pole connections of the capacitor circuit and the corresponding first pole connection 21 of the current valves. The resonance circuit 18b further comprises a third inductor 87 and a fourth inductor 88 connected in series with each other and in series with the capacitor circuit 9 and the current valves 5, 6 between a second 20 of the pole connections of the capacitor circuit and the corresponding second pole connection 22 of the current valves. The resonance circuit 18b further comprises a series connection of a first auxiliary valve 89, a second auxiliary valve 90 and a first capacitor 91, each of which auxiliary valves comprising a semiconductor element 92 of turn-off type, such as an IGBT, a GCT or a GTO, and a rectifying member 93 in the form of a diode, such as a free wheeling diode, connected in antiparallel therewith. Said series connection has one 94 of its ends connected between the first inductor 85 and the second inductor 86 and its other end 95 connected between the third inductor 87 and the fourth inductor 88. The resonance circuit 18b further comprises a second capacitor 96 connected in series with the first auxiliary valve 89 in parallel with a series connection formed by the second auxiliary valve 90 and the first capacitor 91. Said first capacitor 91 constitutes a clamp capacitor.

The inductors 85 and 87 are used in order to insulated the intermediate link capacitors 10a, 10b from the three-phase bridge so that the voltage across the three-phase bridge shortly can be brought to zero in connection with commutation. The two inductors 85, 87 are each able to take up half the pole voltage and consequently insulate the intermediate link capacitors 10a, 10b from the three-phase bridge in a symmetrical manner, which is advantageous in case the capacitor circuit 9 is grounded in its midpoint. The capacitor 91 is a clamp capacitor, which is charged to a voltage that in the normal case is about 20% higher than the pole voltage U. The energy in the clamp capacitor 91 is used in order to start the commutation process. At the initiation of a commutation process, the semiconductor elements 92 of the auxiliary valves 89 and 90 are turned on, whereupon the capacitor 91 begins to force a current through the inductors 85 and 87. When the semiconductor element 92 of the auxiliary valve 90 is subsequently turned off, the current through the inductors 85 and 87 will force the voltage across the capacitor 96 and the voltage across the three-phase bridge down to zero, whereupon all the rectifying components 14 in the three-phase bridge begin to conduct and the snubber capacitors 17 discharges. When the snubber capacitors 17 have been discharged, a commutation may take place in any of the three phase legs 2–4 of the three-phase bridge. The energy that is discharged from the capacitor 96 and the snubber capacitors 17 during this process is shortly transmitted to the intermediate link capacitors 10a, 10b. When the current in the inductors 85 and 87 reverses, the capacitor 96 and the snubber capacitors 17 will begin to recharge, the energy being brought back from the intermediate link capacitors 10a, 10b to the snubber capacitors 17 and to the capacitor 96 and finally also to the clamp capacitor 91. The inductors 86 and 88 represent small inductances that limit the surge from the clamp capacitor 91 and the capacitor 96 to the resonance capacitors 17 of the three-phase bridge when the semiconductor elements 92 of the auxiliary valves 89 and 90 are being turned on. These small inductances may in the extreme case consist of the leakage inductance of the circuit, in which case the inductors 86 and 88 consequently can be omitted.

Each semiconductor element 74, 92 of turn-off type included in the auxiliary valves 71–73, 89, 90 of the above described resonance circuits 18a and 18b is suitably built-up of several series connected, simultaneously controlled semiconductor components of turn-off type, such as several separate IGTB:s or GTO:s. In high-voltage applications a comparatively large number of such semiconductor components is namely required in order to hold the voltage to be held by each auxiliary valve in the blocking state. In the corresponding manner, each rectifying member 75, 84, 93 is suitably built-up of several series connected rectifying components. The semiconductor components of turn-off type and the rectifying components are in the respective auxiliary valve, in the same manner as in the current valves 5, 6, arranged in several series connected circuits, each of which circuit comprising i.a. a semiconductor component of turn-off type and a rectifying component connected in anti-parallel therewith.

Figure 3:
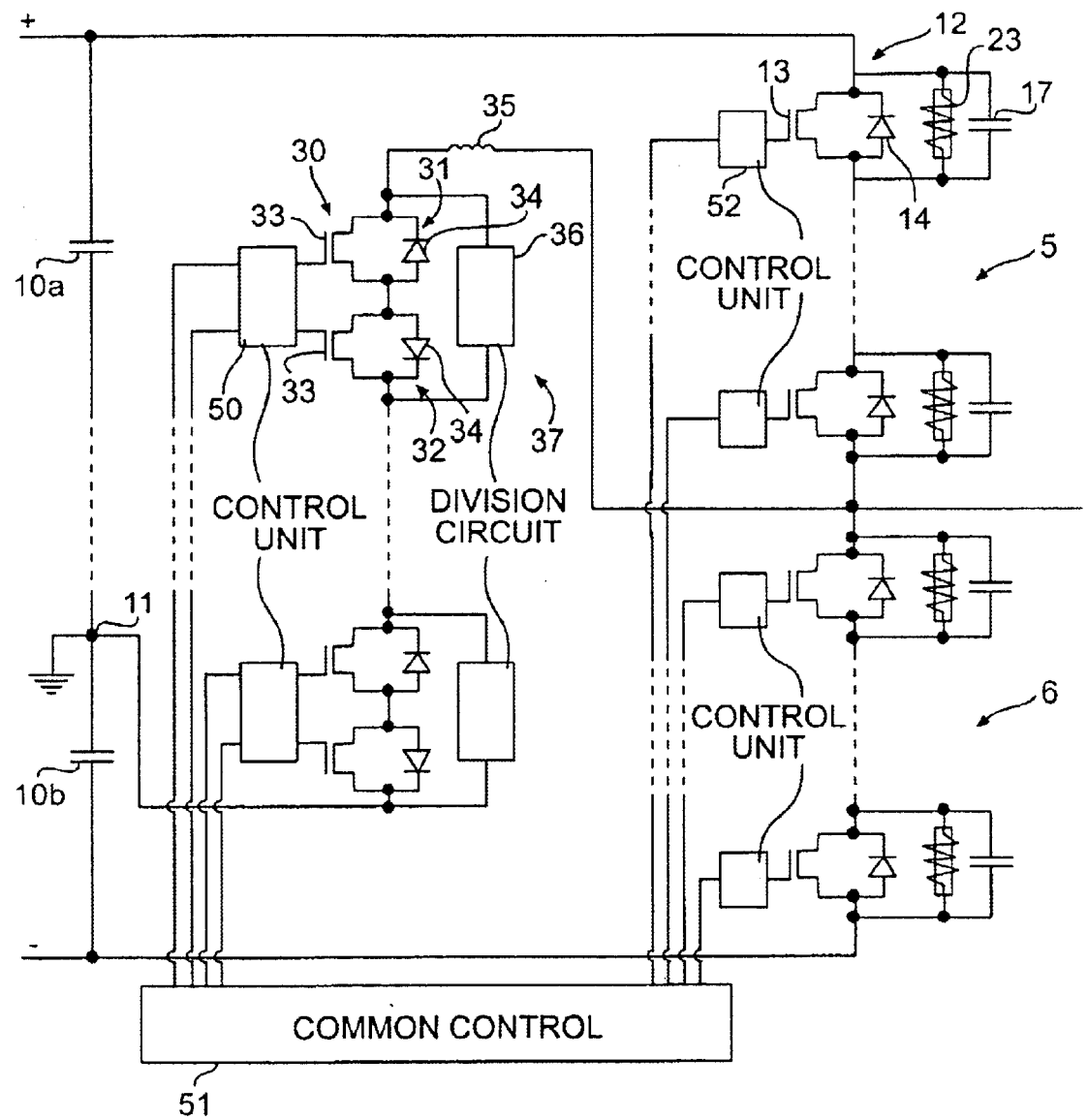
Figure 4:
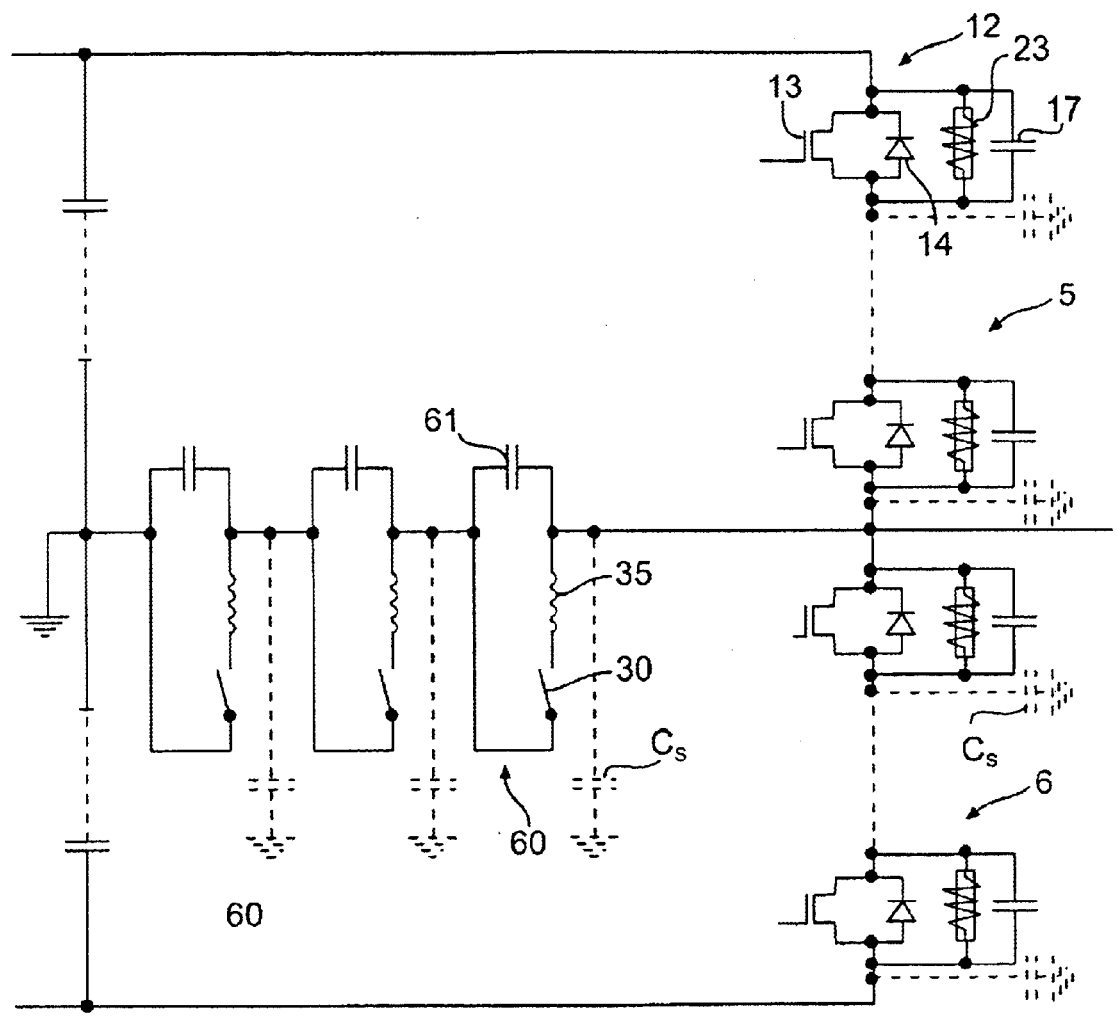

FIGS. 3 and 4 schematically illustrate VSC-converters according to preferred embodiments of the invention, which are provided with a resonance circuit in the form of an ARCP-circuit connected between the phase output 15 and ground. The ARCP-circuit is suitably, as illustrated in FIGS. 3 and 4, connected to the midpoint 11 between the intermediate link capacitors 10a, 10b, that are arranged on the direct voltage side of the converter.

In FIGS. 3 and 4, only the part of the converter that is connected to one phase of an alternating voltage phase line is shown, the number of phases normally being three, but it is also possible that this constitutes the entire converter when the converter is connected to a single phase alternating voltage network. The shown part of the converter constitutes a phase leg 2, and a VSC-converter adapted for a three-phase alternating voltage network comprises three phase legs of the type shown. Just like the embodiments according to FIGS. 1 and 2, the phase leg 2 of the converter illustrated in FIGS. 3 and 4, respectively, comprises two series connected current valves 5, 6, each of which comprising, in accordance with the above indicated, several series connected circuits 12, where each circuit comprises a semiconductor component 13 of turn-off type and a rectifying component 14 of previously described type connected in anti-parallel therewith. In FIGS. 3 and 4, only two series connected circuits of the respective current valve are shown, but the number of such circuits may be considerably larger than that. A midpoint 15 of the series connection between the two current valves 5 and 6, which constitutes the phase output of the converter, is connected to an alternating voltage phase line 16. In this manner, said series connection of current valves is divided into two equal parts with a current valve 5 and 6, respectively, in each such part. Each of these series connected circuits 12 of the respective current valve 5, 6 is provided with a snubber capacitor 17 connected in parallel with the semiconductor component 13 of turn-off type included in the circuit.

In the embodiment illustrated in FIG. 3, the ARCP-circuit comprises an auxiliary valve 37 comprising several series connected sets 30 of auxiliary valve circuits, where each set comprises two series connected auxiliary valve circuits 31, 32, each of which comprising a semiconductor component 33 of turn-off type, such as an IGBT or a GTO, and a rectifying component 34 in the form of a diode, such as a free wheeling diode, connected in anti-parallel therewith. The semiconductor components 33 of turn-off type of the two auxiliary valve circuits in one and the same set are arranged in opposite polarity in relation to each other. The ARCP-circuit further comprises an inductor 35 connected in series with said set of auxiliary valve circuits. This auxiliary valve 37 constitutes a bidirectional valve that can be made to conduct in one or the other direction.

In FIG. 3, only two series connected sets 30 of auxiliary valve circuits in the auxiliary valve 37 are shown, but the number of such sets can be considerably larger than that. The number of sets of auxiliary valve circuits in the auxiliary valve 37 may be optimized independently of the number of series connected circuits 12 in the current valves 5, 6, and depends i.a. on the voltage the resonance circuit is to be able to hold in the blocking state and the characteristics of the individual semiconductor components 33 that are being used. Generally, it can be observed that the auxiliary valve 37 in the blocking state only has to hold half the pole voltage, i.e. U/2, in contrast to the current valves 5, 6 which each has to be dimensioned so as to be able to hold the entire pole voltage U in the blocking state.

Figure 5:
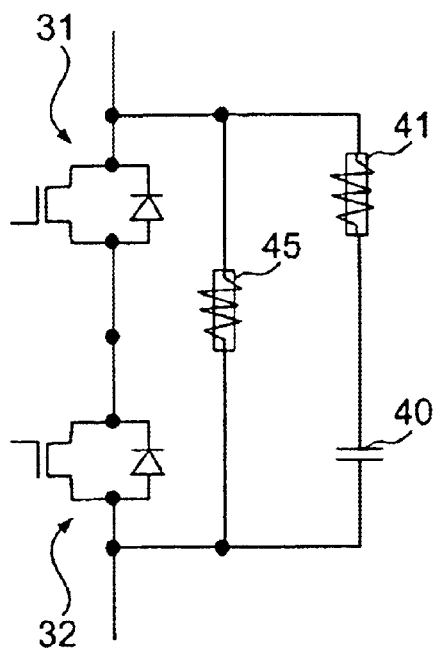
Figure 6:
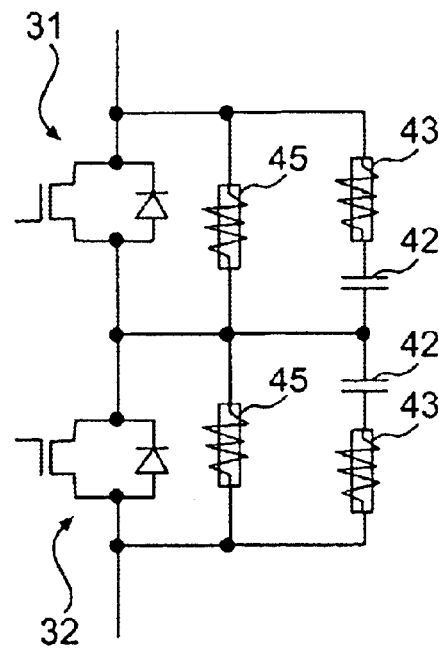
Figure 7:
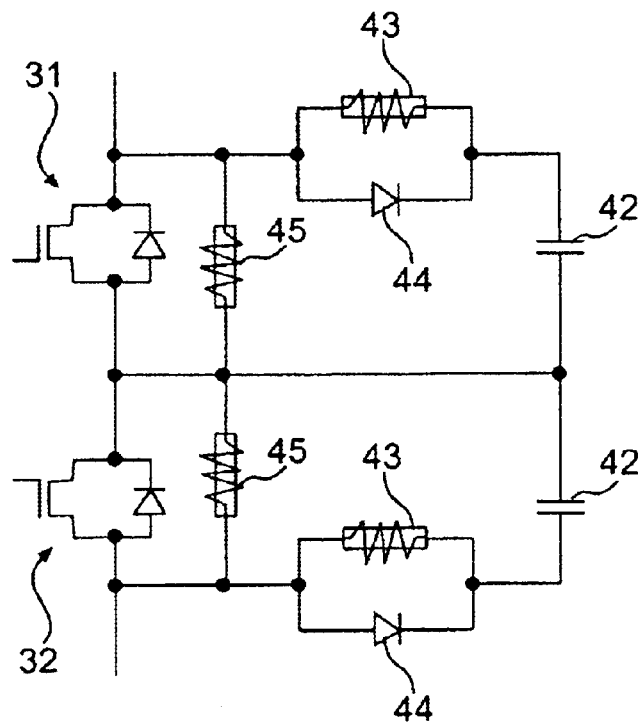

Each set 30 of auxiliary valves circuits is suitably provided with a voltage dividing circuit 36, such as illustrated in FIG. 3, connected in parallel with the auxiliary valve circuits 31, 32 included in the set, in order to obtain a good voltage distribution between the series connected auxiliary valve circuits of the resonance circuit. In FIGS. 5–7, different alternative designs of such voltage dividing circuits are illustrated.

The voltage dividing circuit 36 may, as shown in FIG. 5, comprise a series connection of a capacitor 40 and a resistor 41, which series connection is connected in parallel across both the auxiliary valve circuits 31, 32 of the respective set 30 of auxiliary valve circuits.

The voltage dividing circuit 36 may also, as shown in FIG. 6, comprise to series connections, each of which comprising a capacitor 42 and a resistor 43, these series connections being connected in parallel with a respective auxiliary valve circuit 31, 32 of the respective set 30. Each of the two series connections of the voltage dividing circuit may further, as illustrated in FIG. 7, comprise a rectifying member 44 in the form of a diode connected in parallel with the resistor 43 and in series with the capacitor 42.

In order to further improve the voltage distribution between the auxiliary valve circuits 31, 32 of the auxiliary valve, the voltage dividing circuit 36 should include a high-ohmic resistor 23. In the voltage dividing circuit 36 illustrated in FIG. 5, a high-ohmic resistor 45 is in such a case connected in parallel with the series connection of the resistor 41 and the capacitor 40. In the voltage dividing circuits 36 illustrated in FIGS. 6 and 7, a high-ohmic resistor 45 is in such a case connected in parallel with each of the auxiliary valve circuits 31, 32. The resistance of these resistors 45 is adapted in such a manner that disparities in leakage current in the different semiconductor components 33 in an auxiliary valve 37, when this is in the blocking state, will not cause any inequality to speak of in the voltage distribution between the auxiliary valve circuits 31, 32 of the auxiliary valve.

Each set 30 of auxiliary valve circuits in the auxiliary valve 37 is suitably, as illustrated in FIG. 3, provided with its own control unit 50, which is adapted to control the turn-on and turn-off of the semiconductor components 33 of turn-off type included in the set, all control units of the auxiliary valve being connected to a common control member 51, which is adapted to simultaneously send control signals to all these control units 50. Hereby, a simultaneous control of all the auxiliary valve circuits 31, 32 of the auxiliary valve is secured.

It is further preferred that each of the semiconductor components 13 of turn-off type included the current valves 5, 6 of the converter, as illustrated in FIG. 3, is provided with its own control unit 52, which is adapted to control turn-on and turn-off of the semiconductor component 13, all control units 52 of the current valves being connected to a common control member 51, which is adapted to simultaneously send control signals to all control units 52 included in a current valve 5, 6. Hereby, a simultaneous control of all the semiconductor components 13 of a current valve is secured. In this case, the control units 50 of the auxiliary valve and the control units 52 of the current valves are advantageously connected to one and the same control member 51. The inventional VSC-converter is preferably controlled with PWM-technique (PWM=Pulse Width Modulation).

According to a further preferred embodiment of the invention, which is illustrated in FIG. 4, the ARCP-circuit comprises several series connected partial circuits 60, each of which comprising a set 30 of auxiliary valve circuits 31, 32 of the above described type connected in series with an inductor 35. For the sake of simplicity, each such set 30 of auxiliary valve circuits is in FIG. 4 indicated with the symbol for a switch. The ARCP-circuits comprises also here a number of capacitors 61, which are connected in parallel with a respective partial circuit 60. By dividing the inductance of the resonance circuit on several separate inductors 35 and arranging a capacitor 61 connected in parallel with each of said partial circuits 60 in this manner, the problem with unequal voltage distribution between the auxiliary valve circuits 31, 32 included in the resonance circuit 18, which unequal voltage distribution is caused by stray capacitances $C_s$ to ground, is reduced. For the capacitors 61 to be able to achieve this, it is required that the total capacitance across the series connected capacitors 61 of the resonance circuit is considerably higher than the total stray capacitance of the resonance circuit. Said stray capacitances $C_s$ between the auxiliary valve circuits and ground are in FIG. 4 symbolised with broken lines.

Stray capacitances $C_s$ also occur between the current valves 5, 6 and ground, which stray capacitances also are symbolised with broken lines in FIG. 4. The negative effect of these stray capacitances with respect to the voltage distribution of the semiconductor components 13 of turn-off type in the current valves is limited by means of the snubber capacitors 17. For the snubber capacitors 17 to be able to achieve this, it is required that the total capacitance across the series connected snubber capacitors 17 of the respective current valve 5, 6 is considerably higher than the total stray capacitance of the current valve.

According to a preferred embodiment of the invention, the respective current valve 5, 6 comprises such a number of series connected circuits 12, where each circuit comprises a semiconductor component 13 of turn-off type and a rectifying component 14 connected in anti-parallel therewith, that at least one of these circuits 12 is redundant with respect to the voltage that the current valve 5, 6 is intended to hold in the blocking state. I.e. the circuits 12 are so many in number and so dimensioned that the respective current valve 5, 6 in the blocking state is able to hold the pole voltage U even if one of the circuits 12 of the current valve would drop out and not help to hold any voltage. Hereby, the current valve 5, 6 can continue to operate even in case of a breakdown in a component in any of these series connected circuits 12. In this connection, it is preferred that each of said series connected circuits 12 is so designed that the circuit is short-circuited in case of an electric fault in the circuit. Hereby, it is secured that a breakdown in a circuit will get as little influence as possible on the operation of the current valve, since the current relatively unimpededly is allowed to pass the broken-down circuit in both directions. In order to secure a short-circuiting of a circuit in case of an electric fault in the semiconductor component 13 of turn-off type or the rectifying component 14, the semiconductor components 13 of turn-off type and the rectifying components 14 in the current valves should be of "press pack" type. Furthermore, the snubber capacitors 17 should be of so-called self-healing type, which implies that an internal spark-over in the capacitor is insulated without the capacitor being short-circuited. The capacitance of such a capacitor only decreases a little when the capacitor is degraded and in case of a complete degradation the capacitance will go towards zero so that the capacitor will get the character of an electrically insulating component.

According to a further preferred embodiment of the invention, the auxiliary valve 37 of the ARCP-circuit comprises such a number of said sets 30 of auxiliary valve circuits that at least one of the sets is redundant with respect to the voltage that the auxiliary valve 37 is intended to hold in the blocking state. I.e. the sets 30 of auxiliary valve circuits are so many in number and so dimensioned that the auxiliary valve 37 in the blocking state is able to hold half the pole voltage U/2 even if one of the auxiliary valve circuits 31, 32 would drop out and not help to hold any voltage. Hereby, the auxiliary valve 37 can continue to operate even in case of a breakdown in a component in any of the auxiliary valve circuits. Also here, it is preferred that each of the auxiliary valve circuits is so designed that the auxiliary valve circuit is short-circuited in case of an electric fault therein. Hereby, it is secured that a breakdown in an auxiliary valve circuit 31, 32 will get as little influence as possible on the operation of the auxiliary valve, since the current relatively unimpededly is allowed to pass the broken-down auxiliary valve circuit in both directions. In order to secure a short-circuiting of an auxiliary valve circuit 31, 32 in case of an electric fault in the semiconductor component 33 of turn-off type or the rectifying component 34, the semiconductor components 33 of turn-off type and the rectifying components 34 of the auxiliary valve circuits should be of "press pack" type. Furthermore, the capacitors 42 included in the voltage dividing circuits 36 should be of self-healing type.

In order to further improve the voltage distribution between the semiconductor components 13 of turn-off type of the respective current valve 5, 6, each of the series connected circuits 12 of the respective current valve should comprise an high-ohmic resistor 23 connected in parallel with the semiconductor component 13 of turn-off type included in the circuit and in parallel with the snubber capacitor 17 included in the circuit. The resistance of these resistors 23 is adapted in such a manner that disparities in leakage current of the different semiconductor components 13 in a current valve 5, 6, when this is in the blocking state, will not cause any inequality to speak of in the voltage distribution between the semiconductor components 13 of the current valve.

The semiconductor components of turn-off type that are intended to be included in the current valves and/or auxiliary valves of the inventional converter are intended to be designed for very low conduction losses combined with a high voltage-blocking capacity of 2 kV or higher. It is preferred that said semiconductor components are designed to be able to shortly block a voltage of 4 kV or more. The snubber capacitors 17 preferably have a capacitance of 1 $\mu$F or more.

The inventional VSC-converter is preferably designed for network voltages of 130–400 kV, but may also be designed for voltages for instance in the order of 10–130 kV.

The function of an ARCP-circuit of the type illustrated in FIGS. 3 and 4 is well known to a person skilled in the art and is for instance described in U.S. Pat. No. 5,047,913, and will therefore not be more closely described here.

It is emphasized that the invention is in no way limited to VSC-converters having only two series connected current valves per phase leg, but is also intended to embrace converters having a larger number of current valves and where the current valves are arranged in another way than shown in FIGS. 1–4. It is also emphasized that the converter according to the invention may have its direct voltage side designed in another way than shown in FIGS. 1–4, and for instance may comprise more than two series connected intermediate link capacitors.

The invention is of course neither as to the rest in any way restricted to the preferred embodiments described above, on the contrary many possibilities to modifications thereof should be apparent to a person skilled in the art without departing from the basic idea of the invention as defined in the appended claims.

What is claimed is:

1. A VSC-converter for converting direct voltage into alternating voltage and vice versa, which comprises a series connection of at least two current valves arranged between two poles, a positive and a negative, of a direct voltage side of the converter, each current valve consisting of several series connected circuits, each of which circuits comprising a semiconductor component of turn-off type and a rectifying component connected in antiparallel therewith, an alternating voltage phase line being connected to a midpoint, denominated phase output, of the series connection of current valves between two of said current valves while dividing the series connection into two equal parts, wherein each of the series connected circuits of the respective current valve, in order to make possible a good voltage distribution between the semiconductor components of turn-off type included in the respective current valve, comprises a snubber capacitor connected in parallel with the semiconductor component of turn-off type included in the circuit, and that the converter comprises a resonance circuit for recharging the snubber capacitors of the current valves so as to thereby make possible a turn-on of the semiconductor components of turn-off type of the current valves at low voltage across the semiconductor components.

2. The VSC-converter according to claim 1, wherein the converter is controlled with PWM-technique.

3. The VSC-converter according to claim 1, wherein the resonance circuit is of quasi-resonant type.

4. The VSC-converter according to claim 3, wherein the resonance circuit is of an ARCP-circuit.

5. The VSC-converter according to claim 4, wherein the ARCP-circuit comprises several series connected partial circuits, each of which comprising a set of auxiliary valve circuits connected in series with an inductor, and that the ARCP-circuit further comprises a number of capacitors, which are connected in parallel with a respective partial circuit.

6. The VSC-converter according to claim 4, wherein the ARSP-circuit comprises an auxiliary valve comprising several series connected sets of auxiliary valve circuits, where each set comprises two series connected auxiliary valve circuits, each of which comprising a semiconductor component of turn-off type and a rectifying component connected in anti-parallel therewith, the semiconductor components of turn-off type of the two auxiliary valves in one and the same set being arranged in opposite polarity in relation to each other.

7. The VSC-converter according to claim 6, wherein the auxiliary valve comprises such a number of said sets of auxiliary valve circuits that at least one of the sets is redundant with respect to the voltage that the auxiliary valve is intended to hold in the blocking state.

8. The VSC-converter according to claim 7, wherein each of the auxiliary valve circuits is so designed that the auxiliary valve circuit is short-circuited in case of an electrical fault therein.

9. The VSC-converter according to claim 4, wherein the ARCP-circuit comprises an auxiliary valve comprising at least one set of two series connected auxiliary valve circuits, each of which comprising a semiconductor component of turn-off type and a rectifying component connected in anti-parallel therewith, the semiconductor components of turn-off type of the two auxiliary valves being arranged in opposite polarity in relation to each other, and that the ARCP-circuit further comprises an inductor connected in series with said set of auxiliary valve circuits.

10. The VCS-converter according to claim 9, wherein each set of auxiliary valve circuits comprises a voltage dividing circuit connected in parallel with the auxiliary valve circuits included in the set.

11. The VSC-converter according to claim 9, wherein each set of auxiliary valve circuits is provided with its own control unit, which is adapted to control turn-on and turn-off of the semiconductor components of turn-off type included in the set, all control units of the auxiliary valve being connected to a common control member, which is adapted to send control signals simultaneously to all these control units.

12. The VSC-converter according to claim 11, wherein each semiconductor component of turn-off type included in the current valves is provided with its own control unit, all control units of the current valves being connected to the common control member, which is adapted to send control signals simultaneously to all control units included in a current valve.

13. The VSC-converter according to claim 3, the converter comprising a capacitor circuit arranged between the two poles on the direct voltage side of the converter, said capacitor circuit comprising one intermediate link capacitor or several series connected intermediate link capacitors, wherein the resonance circuit is connected between the two pole connections of the capacitor circuit and the two pole connections of the current valves.

14. The VSC-converter according to claim 13, wherein resonance circuit comprises a first, a second and a third auxiliary valve, each comprising a semiconductor element of turn-off type and a rectifying member connected in anti-parallel therewith, the first auxiliary valve having one end connected to a first of the pole connections of the capacitor circuit and its other end connected to the corresponding first pole connection of the current valves, the second auxiliary valve having one end connected to a second of the pole connections of the capacitor circuit and its other end connected to the corresponding second pole connection of the current valves, that the third auxiliary valve forms a series connection together with a capacitor and an inductor, which series connection has one end connected between the second end of the first auxiliary valve and the first pole connection of the current valves and its other end connected between the second end of the second auxiliary valve and the second pole connection of the current valves, and that the resonance circuit further comprises a rectifying member connected in series with the inductor and in parallel with a series connection formed by the third auxiliary valve and said capacitor.

15. The VSC-converter according to claim 13, wherein the resonance circuit comprises a first and a second inductor connected in series with each other and in series with the capacitor circuit and the current valves between a first of the pole connections of the capacitor circuit and the corresponding first pole connection of the current valves, a third and a fourth inductor connected in series with each other and in series with the capacitor circuit and the current valves between a second of the pole connections of the capacitor circuit and the corresponding second pole connection of the current valves, a series connection of a first auxiliary valve, a second auxiliary valve and a first capacitor, each of which auxiliary valves comprising a semiconductor element of turn-off type and a rectifying member connected in anti-parallel therewith, said series connection having one end connected between the first inductor and the second inductor and its other end connected between the third inductor and the fourth inductor, and a second capacitor connected in series with the first auxiliary valve and in parallel with a series connection formed by the second auxiliary valve and the first capacitor, the first capacitor constituting a clamp capacitor.

16. The VSC-converter according to claim 1, wherein the respective current valve comprises such a number of said series connected circuits that at least one of these circuits is redundant with respect to the voltage that the current valve is intended to hold in the blocking state.

17. The VSC-converter according to claim 16, wherein each of the series connected circuits of the current valves is so designed that the circuit is short-circuited in case of an electrical fault therein.

18. The VSC-converter according to claim 1, wherein the semiconductor components of turn-off type of the current valves and/or auxiliary valves are of press pack-type.

19. The VSC-converter according to claim 1, wherein each of the series connected circuits of the respective current valve comprises a resistor connected in parallel with the semiconductor component of turn-off type included in the circuit and in parallel with the snubber capacitor included in the circuit.

* * * * *